(12) United States Patent
Clarke

(10) Patent No.: US 8,080,304 B2
(45) Date of Patent: Dec. 20, 2011

(54) MULTI-LAYER WRAP

(75) Inventor: Thomas F. Clarke, Mississauga (CA)

(73) Assignee: Western Plastics Inc. (CA)

( * ) Notice: Subject to any disclaimer, the term of this patent is extended or adjusted under 35 U.S.C. 154(b) by 834 days.

(21) Appl. No.: 11/348,521

(22) Filed: Feb. 6, 2006

(65) Prior Publication Data

US 2007/0178278 A1   Aug. 2, 2007

(30) Foreign Application Priority Data

Feb. 1, 2006 (CA) .................................... 2534943

(51) Int. Cl.
*B32B 3/24* (2006.01)

(52) U.S. Cl. ..................... 428/137; 428/906; 242/160.4; 242/170; 242/520

(58) Field of Classification Search .................. 428/137, 428/906; 242/160.4, 170, 520
See application file for complete search history.

(56) References Cited

U.S. PATENT DOCUMENTS

| | | | |
|---|---|---|---|
| 4,340,558 A | 7/1982 | Hendrickson | |
| 4,592,938 A * | 6/1986 | Benoit | 428/35.5 |
| 5,013,595 A * | 5/1991 | Parry | 428/77 |
| 5,049,423 A | 9/1991 | German, Jr. | |
| 5,066,526 A | 11/1991 | German, Jr. | |
| 5,175,049 A | 12/1992 | Huff et al. | |
| 5,741,387 A | 4/1998 | Coleman | |
| 5,814,399 A | 9/1998 | Eichbauer | |
| 5,888,615 A | 3/1999 | Mascarenhas et al. | |
| 5,916,692 A | 6/1999 | Brambilla | |
| 5,935,681 A | 8/1999 | Paulett | |
| 5,976,682 A | 11/1999 | Eichbauer | |
| 6,132,827 A * | 10/2000 | Miro | 428/35.9 |
| 6,171,681 B1 | 1/2001 | Mascarenhas et al. | |
| 6,265,055 B1 | 7/2001 | Simpson | |
| 6,692,805 B2 | 2/2004 | Bonke | |
| 6,767,601 B2 | 7/2004 | Colombo | |
| 6,774,062 B1 | 8/2004 | Bryniarski | |
| 6,777,046 B1 | 8/2004 | Tatarka et al. | |
| 6,942,909 B2 | 9/2005 | Shirrell et al. | |
| 2002/0037386 A1 | 3/2002 | Bonke | |
| 2003/0151159 A1 | 8/2003 | Santigteban et al. | |
| 2004/0033741 A1 | 2/2004 | Peng | |
| 2004/0084803 A1 | 5/2004 | Bonke | |
| 2004/0097157 A1 | 5/2004 | Cosentino | |

(Continued)

FOREIGN PATENT DOCUMENTS

GB    2348633 A  * 10/2000

(Continued)

OTHER PUBLICATIONS

Plastic Wrap article search, pp. 1-61 (Jun. 3, 2009).

(Continued)

*Primary Examiner* — William P Watkins, III

(74) *Attorney, Agent, or Firm* — Harness, Dickey & Pierce, P.L.C.

(57) ABSTRACT

A stretchable multi-layer wrap is provided. The wrap comprises a first film, which comprises an inside cling surface, a second film, which comprises an inside cling surface. The second film inside cling surface engages the first film inside cling surface. The wrap also comprises a plurality of longitudinal ribs that are co-aligned with a longitudinal axis of the wrap. The ribs are disposed between the engaged cling surfaces and spaced so as not to cause disengagement of the cling surfaces.

68 Claims, 7 Drawing Sheets

U.S. PATENT DOCUMENTS

| | | |
|---|---|---|
| 2004/0127119 A1 | 7/2004 | Brighton et al. |
| 2005/0096613 A1 | 5/2005 | Carper et al. |
| 2005/0118391 A1* | 6/2005 | Kavvadias et al. ............ 428/131 |
| 2005/0123721 A1* | 6/2005 | Heikaus et al. ............... 428/137 |
| 2005/0124240 A1 | 6/2005 | Porter |
| 2005/0158567 A1 | 7/2005 | Carper et al. |
| 2007/0178284 A1 | 8/2007 | Barry |

FOREIGN PATENT DOCUMENTS

| | | |
|---|---|---|
| WO | WO 00/61359 | 10/2000 |

OTHER PUBLICATIONS

"Plastic Wrap", Wikipedia article (Apr. 27, 2009).

* cited by examiner

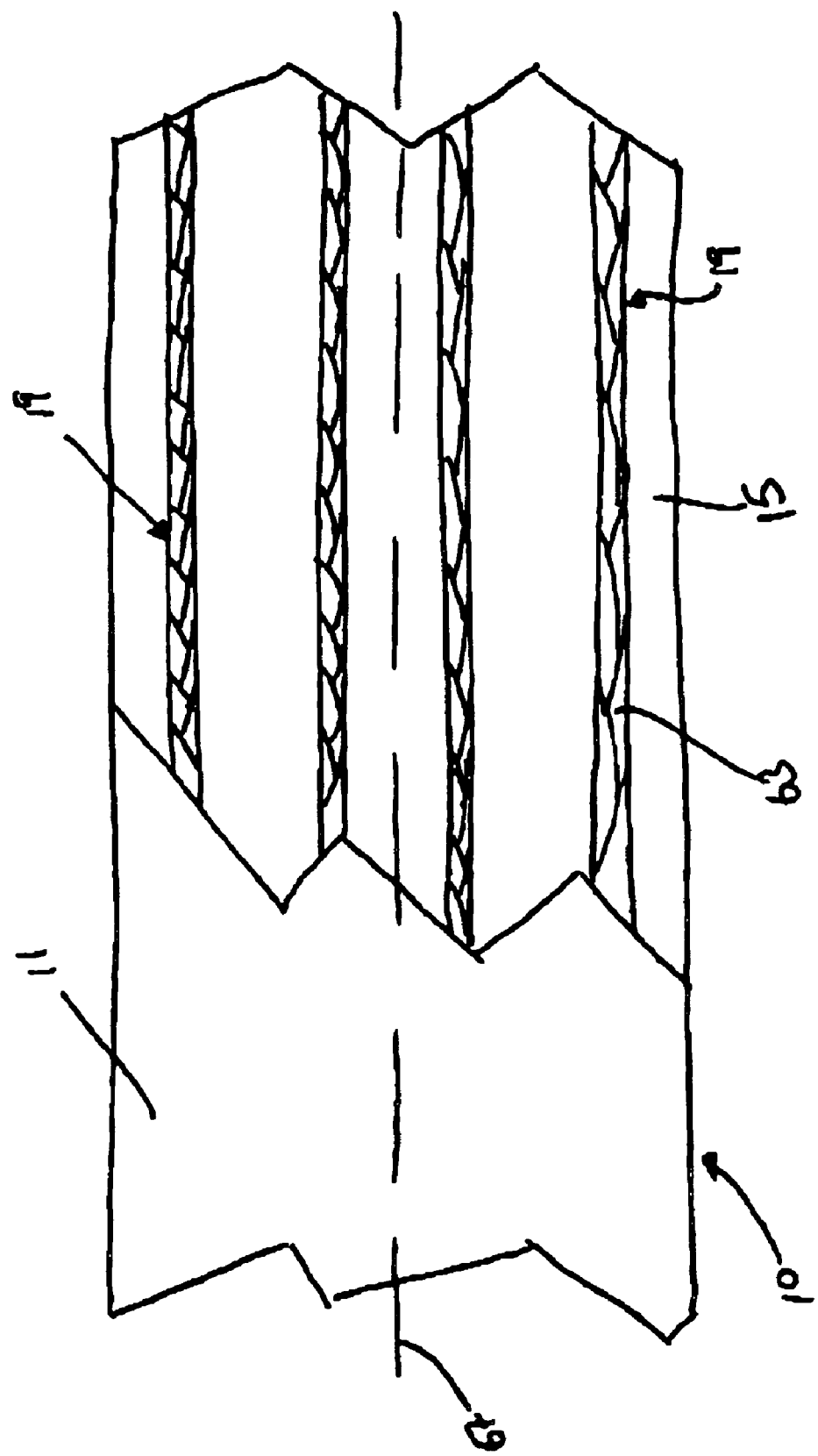

MULTI-LAYER WRAP

FIELD OF THE INVENTION

The present invention relates to wraps. More particularly, the present invention relates to multi-layer wraps.

BACKGROUND OF THE INVENTION

Wraps permit unitisation of a number of loosely held items. The structure of any given wrap is dictated to an extent by the particular function it is intended to serve. There are several variables to consider, such as mass, shape, storage conditions and transport conditions. The metal industry, for example, requires unitisation of heavy items, such as large rolls of feedstock material (e.g., steel or aluminium coils). The items may also be susceptible to various environmental conditions. Other concerns include the cost effectiveness of the particular wrap, the ease with which it can be made and its ease of use. There exists a need for a wrap that obviates or mitigates the effects of at least some of the above-presented variables.

SUMMARY OF THE INVENTION

A stretchable multi-layer wrap is provided. The wrap comprises a first film, which comprises an inside cling surface, and a second film, which comprises an inside cling surface. The second film inside cling surface engages the first film inside cling surface. The wrap also comprises a plurality of longitudinal ribs that are co-aligned with a longitudinal axis of the wrap. The ribs are disposed between the engaged cling surfaces and spaced so as not to cause disengagement of the cling surfaces.

The stretchable multi-layer wrap may further comprise a third film, which comprises a cling surface; and, the second film may further comprise an outside cling surface, which is opposite the inside cling surface. The third film cling surface engages the second film outside cling surface.

Further stretching of the wrap may be limited by the stretching properties of the ribs.

The plurality of longitudinal ribs may further comprise a plurality of transverse ribs extending between and interconnecting the longitudinal ribs.

A stretchable multi-layer wrap comprising a plurality of cling films is also provided. Each film comprises respective opposing cling surfaces. The films are arranged so as to effect cling surface laminar engagement of the films. The wrap also comprises a plurality of longitudinal ribs that are co-aligned with a longitudinal axis of the wrap. The ribs are disposed between the engaged cling surfaces and spaced so as not to cause disengagement of the cling surfaces.

LIST OF FIGURES

Preferred embodiments of the present invention are described below with reference to the accompanying drawings in which.

DETAILED DESCRIPTION OF THE INVENTION

Figure 1:
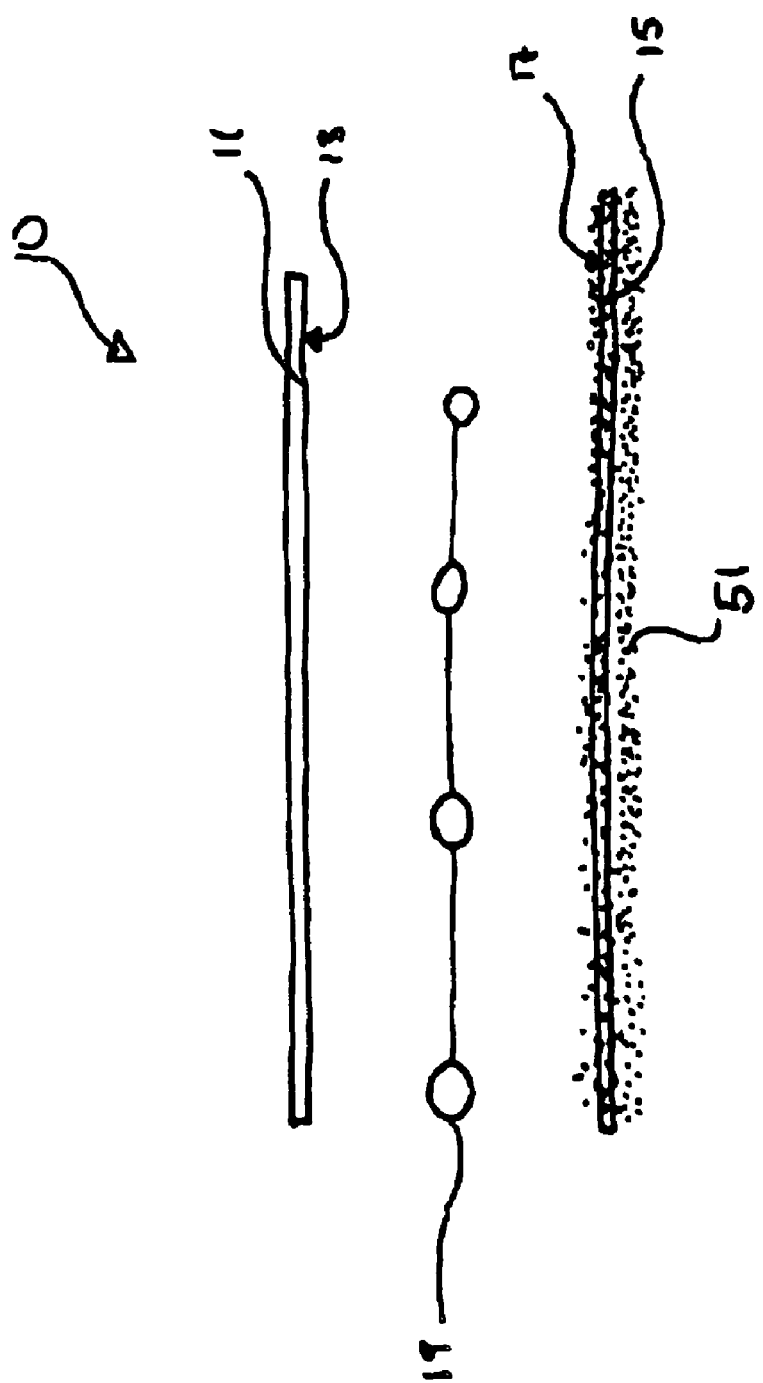
FIG. 1 is a transverse cross-sectional profile of a stretchable multi-layer wrap according to an embodiment of the present invention.

Referring to FIG. 1 a transverse cross-sectional view of a stretchable multi-layer wrap 10 is illustrated according to an embodiment of the present invention. The stretchable multi-layer wrap 10 comprises a first film 11, which in turn comprises an inside cling surface 13, and a second film 15, which in turn comprises an inside cling surface 17. The second film inside cling surface 17 engages the first film inside cling surface 13. The wrap 10 also comprises a plurality of longitudinal ribs 19 that are co-aligned with a longitudinal axis (not shown) of the wrap. The ribs 19 are disposed between the engaged cling surfaces (13,17) and spaced so as not to cause disengagement of the cling surfaces (13,17).

In a preferred embodiment, the first and second cling films (11,15) are similarly composed. For example, the films (11, 15) may be comprised of a low density polyethylene, linear low density polyethylene, linear medium density polyethylene, high density polyethylene and polypropylene. It will be apparent to those skilled in the art that the composition and other physical characteristics (e.g., gauge, permeability, density) of the respective cling films (11,15) may be varied to suit a task's particular wrapping requirements. For example, the films (11,15) may be dissimilar in at least any one of composition, gauge, permeability, density, or any other physical or chemical characteristic.

The first and second cling films (11,15) may be pallet wrap stretch films or cling films, as is known in the art. For example, the respective stretch film layers may be mono-layer or co-extruded multi-layer cast film. Alternately, the films (11,15) may be mono-layer or multi-layer blown film or combinations of blown and cast films. The first and second cling films (11,15) may also be comprised of pre-stretched film, as is known in the art, and further stretching of the wrap is limited by the stretching properties of the ribs.

In some instances the wrap 10 may further comprise vents or perforations (not shown) arranged on the wrap 10 so as to permit venting of a wrapped item. For example, the vents may be formed as slits, pin pricks, holes or combinations thereof. It will be apparent to those skilled in the art the kind, number and distribution of the holes may be varied to suit the needs of the particular wrapping task.

In a preferred embodiment, the second film 15, which comes into contact with a wrapped item, further comprises a rust inhibiting agent 51 (illustrated as a layer of dots). The rust inhibiting agent 51 is preferably integrally formed with the second film. However, it will be apparent to those skilled in the art that the rust inhibiting agent may be applied to a surface opposite the second film cling surface 17.

The rust inhibiting agent 51 preferably comprises a vapour corrosion inhibitor such as inorganic nitrites, molybdates or carbonates. It will be apparent that the vapour corrosion inhibitor selected may be varied to suit the needs of the particular wrapping task.

The cling films (11,15) may be treated in any of a number of ways dictated by the particular wrapping requirements of a given task. In addition to treating the films (11,15) with the rust inhibiting agent 51, they may also be treated so as to, among other things, inhibit or block ultraviolet radiation, may be colour tinted or made opaque, may be printed, may receive anti-static treatment and or may include slip additives. It will be apparent that the film treatment selected may be varied to suit the needs of the particular wrapping task.

Figure 4:
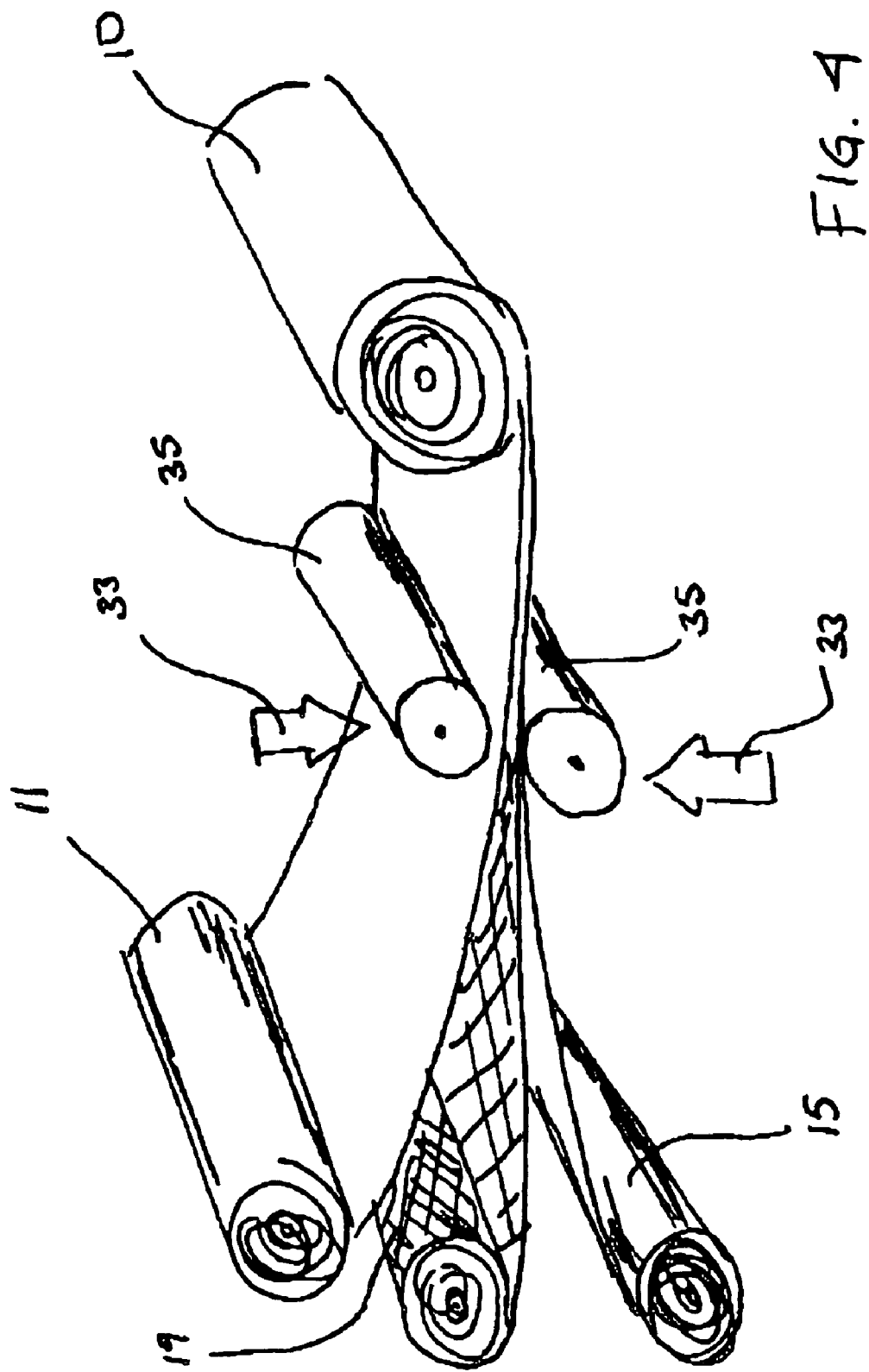
FIG. 4 is a perspective view illustrating a manner of manufacturing a stretchable multi-layer wrap according to an embodiment of the present invention.

The stretchable multi-layer wrap 10 may be manufactured in a number of ways. Referring to FIG. 4, a perspective view of one such manner of manufacture is illustrated. Feedstock rolls of the first cling film 11, ribs 19 and second cling film 15 are fed into a roller 35 arrangement. The rollers 35 apply a pressure 33 to the portions of the films (11,15) and ribs 19 that pass between the rollers 35. The pressure 33 applied is sufficient to cause a clinging engagement of the films (11,15), resulting in the stretchable multi-layer wrap 10. The number and kind of feedstock rolls may be varied to suit the given wrapping requirements.

Figure 2:
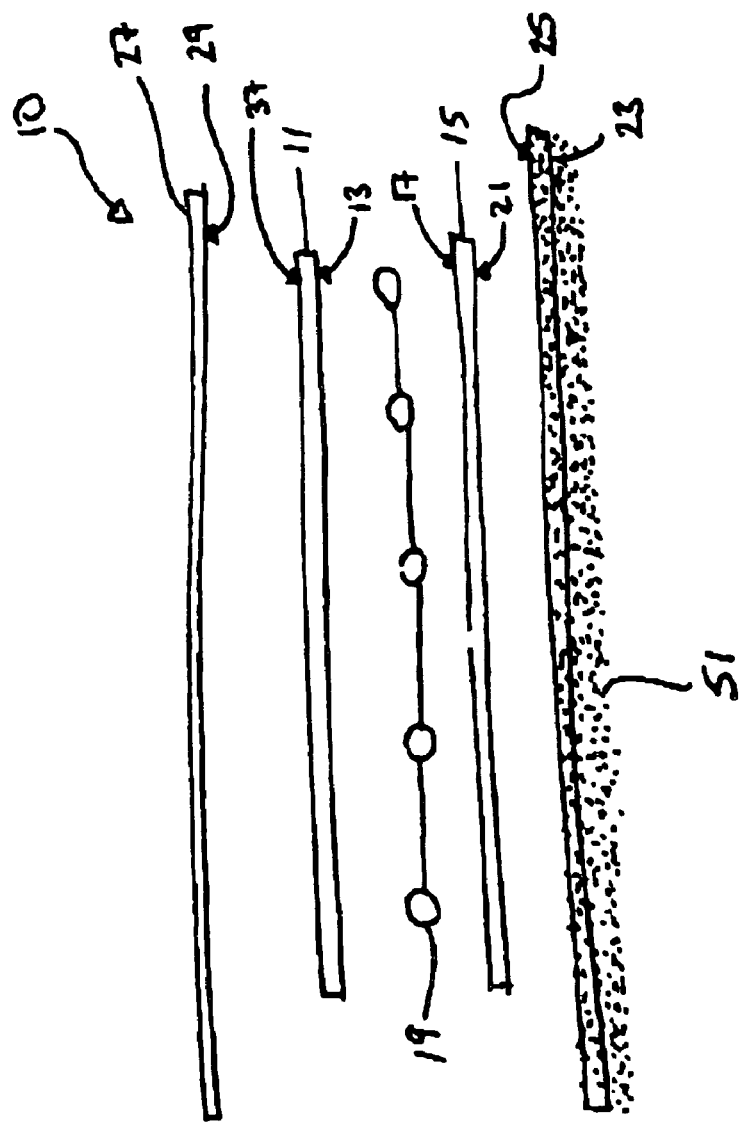
FIG. 2 is a transverse cross-sectional profile of a stretchable multi-layer wrap according to an alternate embodiment of the present invention.

Referring to FIG. 2 a transverse cross-sectional profile of a stretchable multi-layer wrap 10 is illustrated according to an alternate embodiment. The stretchable multi-layer wrap 10 comprises a third film 23, which in turn comprises a cling surface 25, and the second film 15 further comprises an outside cling surface 21, opposite the inside cling surface 17, the third film cling surface 25 engages the second film outside cling surface 21; and, a fourth film 27, which in turn comprises a cling surface 29 and the first film 11 further comprises an outside cling surface 37, opposite the inside cling surface 13, the fourth film cling surface 29 engages the first film outside cling surface 37.

The third and fourth cling films (23,27) may be pallet wrap stretch films or cling films, as is known in the art. For example, the respective stretch film layers may be mono-layer or co-extruded multi-layer cast film. Alternately, the films (23,27) may be mono-layer or multi-layer blown film or combinations of blown and cast films.

In a preferred embodiment, the third film 23 further comprises a rust inhibiting agent 51 (illustrated as a layer of dots). The rust inhibiting agent 51 is preferably integrally formed with the third film 23. However, it will be apparent to those skilled in the art that the rust inhibiting agent may be applied to a surface opposite the third film cling surface 25.

The rust inhibiting agent 51 preferably comprises a vapour corrosion inhibitor such as inorganic nitrites, molybdates or carbonates. It will be apparent that the vapour corrosion inhibitor selected may be varied to suit the needs of the particular wrapping task. As with cling films (11,15), the films (23,27) may also be treated so as to, among other things, block ultraviolet radiation, may be colour tinted or made opaque, and/or may be printed. It will be apparent that the film treatment selected may be varied to suit the needs of the particular wrapping task.

Figure 5:
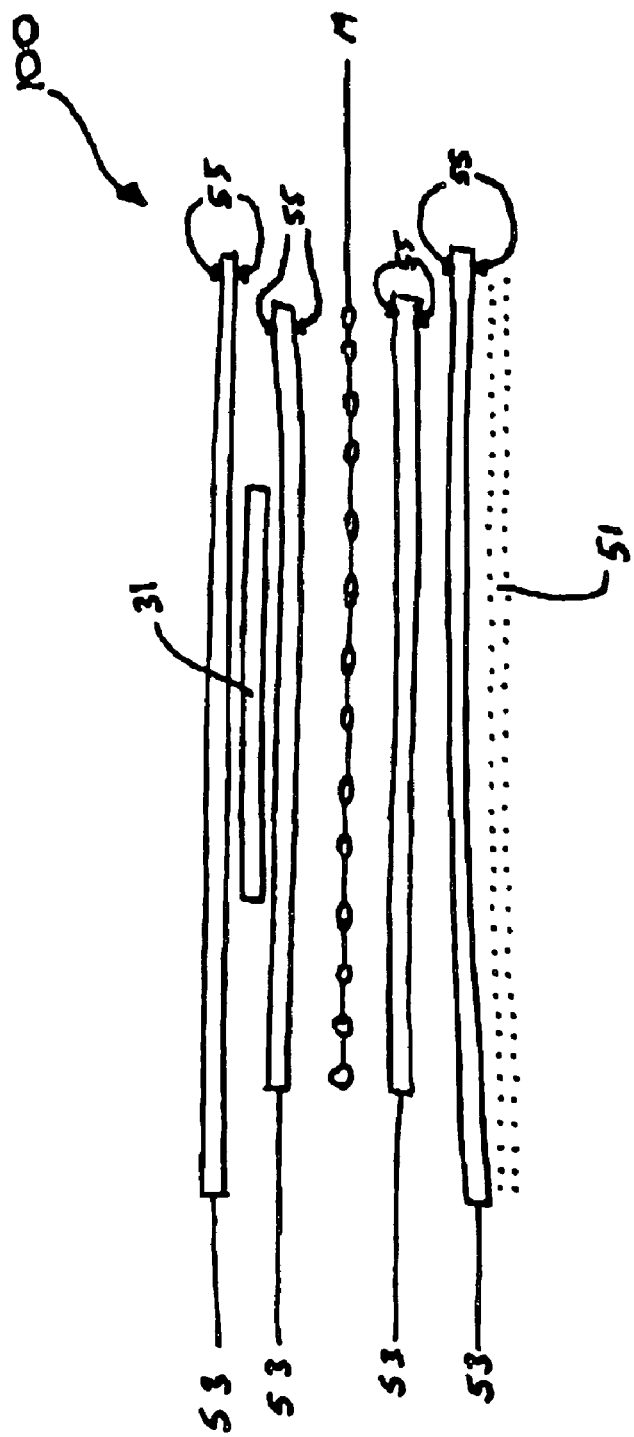
FIG. 5 is a transverse cross-sectional profile of a stretchable multi-layer wrap according to a further alternate embodiment of the present invention.

Referring to FIG. 5, the stretchable multi-layer wrap may alternately be characterised as wrap 100 which comprises a plurality of cling films 53, each film comprising respective opposing cling surfaces 55. The films 53 are arranged so as to effect cling surface laminar engagement of the films 53. The wrap 100 also comprises a plurality of longitudinal ribs 19 that are co-aligned with a longitudinal axis (not shown) of the wrap 100. The ribs 19 are disposed between the engaged cling surfaces 55 and spaced so as not to cause disengagement of the cling surfaces 55.

At least one of outermost films 53 of the plurality of cling films 53 further comprises a rust inhibiting agent 51. The rust inhibiting agent 51 may be integrally formed with the film layer 53 that comes into contact with the wrapped item. Alternately, the rust inhibiting agent 51 may be applied to the cling surface 55 that contacts an item to be wrapped. As with cling films (11,15), any one or more of the films 53 may also be treated so as to, among other things, inhibit or block ultraviolet radiation, may be colour tinted or made opaque, may be printed, may receive anti-static treatment and or may include slip additives. It will be apparent that the film treatment selected may be varied to suit the needs of the particular wrapping task.

The films 53 may be pallet wrap stretch films or cling films, as is known in the art. For example, the respective stretch film layers may be mono-layer or co-extruded multi-layer cast film. Alternately, the films 53 may be mono-layer or multi-layer blown film or combinations of blown and cast films. The films 53 may also be comprised of pre-stretched film, as is known in the art, and further stretching of the wrap is limited by the stretching properties of the ribs.

Figure 3:
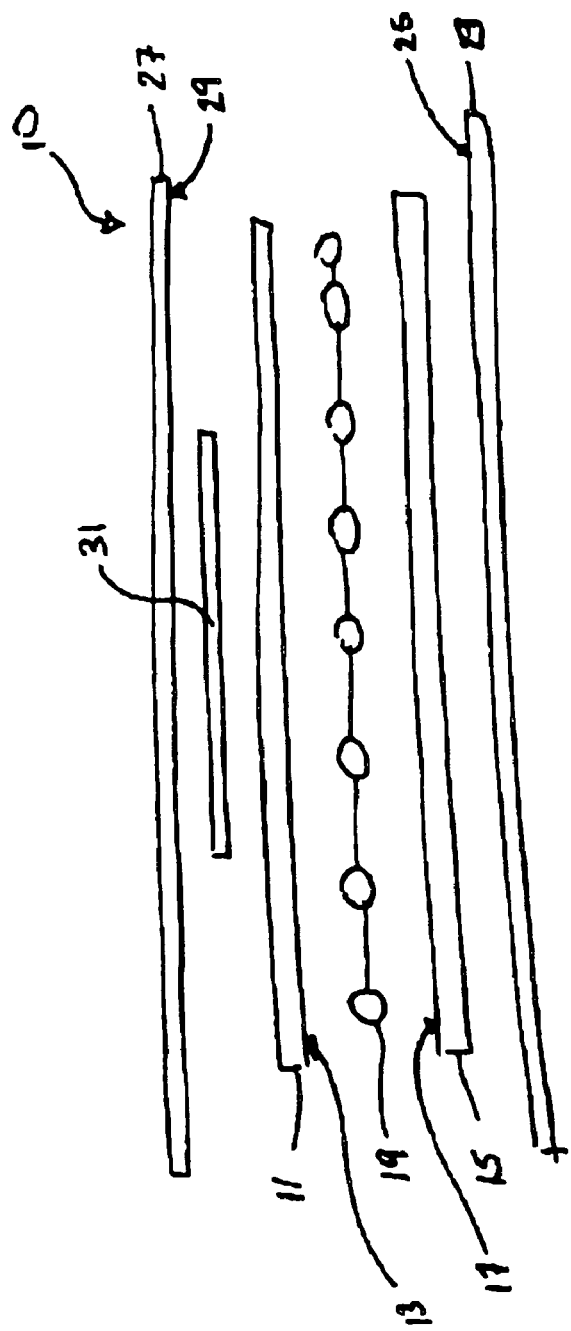
FIG. 3 is a transverse cross-sectional profile of a stretchable multi-layer wrap according to a further alternate embodiment of the present invention.

Referring to FIGS. 3 and 5, the respective wraps 10 and 100 further comprise a label layer 31 positioned between the first and fourth films. The label layer 31 comprises indicia (not shown) indicating a use for the stretchable multi-layer wrap 100. Alternately, the indica may provide branding or location information for the item being wrapped. It will be apparent to those skilled in the art that the type of information conveyed by the indicia may be varied to suit the needs of the particular wrapping task.

Referring to FIG. 7, a cut-away section of the stretchable multi-layer wrap 10 is illustrated. The ribs 19 are co-aligned with a longitudinal axis 67 of the wrap 10. Each respective longitudinal rib 19 preferably comprises an interwoven plurality of rib tapes 63.

Figure 6:
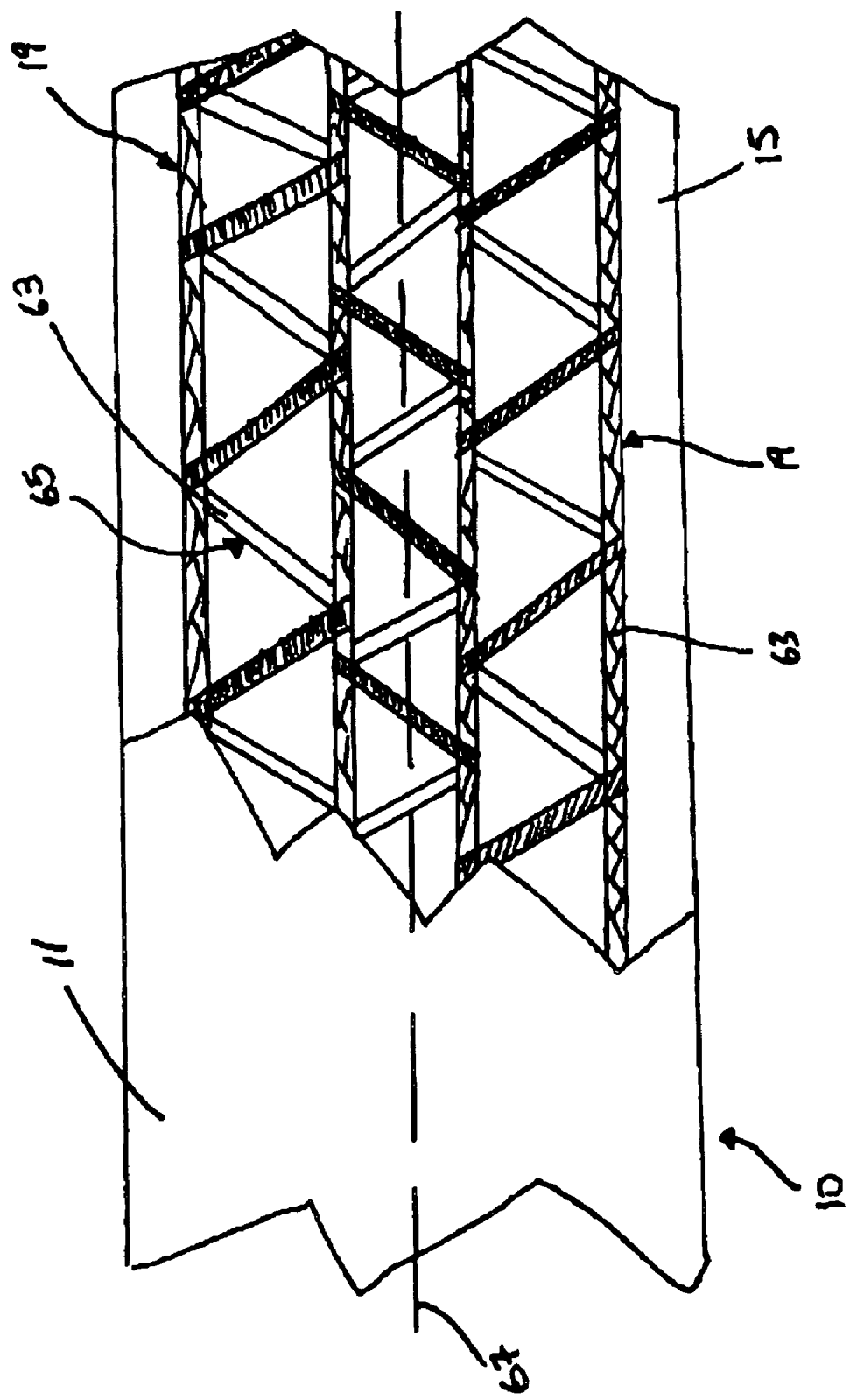
FIG. 6 is a cut-away section of a stretchable multi-layer wrap according to an embodiment of the present invention; and, FIG. 7 is a cut-away section of a stretchable multi-layer wrap according to a further embodiment of the present invention.

Referring to FIG. 6, the ribs 19 may be combined with a plurality of transverse ribs 65 extending between and interconnecting the longitudinal ribs 19. Each respective transverse rib 65 preferably comprises a rib tape 63.

The ribs (19,65) preferably comprise a polymer such as high density polyethylene. Alternately, the ribs (19,65) may be comprised of a low density polyethylene, linear low density polyethylene, linear medium density polyethylene, and polypropylene. It will be apparent to those skilled in the art that the composition and other physical characteristics (e.g., gauge, density) of the respective ribs (19,65) may be varied to suit a task's particular wrapping requirements. For example, the ribs (19,65) may be dissimilar in at least any one of composition, gauge, density, or any other physical or chemical characteristic so as to suit the particular wrapping requirements.

The ribs 19, 65 are preferably stretchable. The desired degree of stretching, however, may vary depending on the wrapping circumstances. Preferably, further stretching of the wrap 10 is limited by the stretching properties of the ribs 19,65.

The above description is intended in an illustrative rather than restrictive sense. Variations may be apparent to those skilled in the art without departing from the spirit and scope of the invention as defined by the claims set out below.

I claim:

1. A stretchable multi-layer wrap for wrapping a metal coil, said wrap comprising:
    a first film having an inside cling surface;
    a second film having an inside cling surface;
    a plurality of ribs between the first film and the second film, the ribs including longitudinal ribs co-aligned with a longitudinal axis of the films and transverse ribs extending between and interconnecting the longitudinal ribs;

the first film, second film and ribs defining a wrap that is stretchable sufficient to wrap a metal coil;

the ribs having stretching properties that limit stretching of the wrap to enable unitisation of the metal coil to reduce its susceptibility to environmental conditions; and the ribs being spaced apart to allow the inside cling surfaces of the first and second films to sufficiently engage to resist disengagement of the cling surfaces when the wrap is wrapped around the metal coil.

2. A stretchable multi-layer wrap according to claim 1, wherein the first and second films are pre-stretched films and further stretching of the wrap is limited by the stretching properties of the ribs.

3. A stretchable multi-layer wrap according to claim 1, wherein the wrap further comprises:

a third film comprising a cling surface and the second film further comprises an outside cling surface, opposite the inside cling surface, the third film cling surface clingingly engaging the second film outside cling surface; and, a fourth film comprising a cling surface and the first film further comprises an outside cling surface, opposite the inside cling surface, the fourth film cling surface clingingly engaging the first film outside cling surface.

4. A stretchable multi-layer wrap according to claim 3, wherein the third film further comprises a rust inhibiting agent.

5. A stretchable multi-layer wrap according to claim 4, wherein the rust inhibiting agent is applied to a surface opposite the third film cling surface.

6. A stretchable multi-layer wrap according to claim 4, wherein the rust inhibiting agent is integrally formed with the third film.

7. A stretchable multi-layer wrap according to claim 6, wherein the rust inhibiting agent comprises a vapour corrosion inhibitor.

8. A stretchable multi-layer wrap according to claim 1, wherein the first and second films are similarly composed.

9. A stretchable multi-layer wrap according to claim 8, wherein the films comprise a low density polymer.

10. A stretchable multi-layer wrap according to claim 9, wherein the low density polymer comprises a low density polyethylene.

11. A stretchable multi-layer wrap according to claim 1, wherein each respective longitudinal rib comprises an interwoven plurality of rib tapes.

12. A stretchable multi-layer wrap according to claim 11, wherein each respective transverse rib comprises a rib tape.

13. A stretchable multi-layer wrap according to claim 12, wherein the rib tapes comprise one of a low density polymer, a high density polymer and combinations thereof.

14. A stretchable multi-layer wrap according to claim 13, wherein the high density polymer is a high density polyethylene.

15. A stretchable multi-layer wrap according to claims 1 and 2, wherein the wrap further comprises vents arranged on the wrap so as to permit venting of a wrapped item.

16. A stretchable multi-layer wrap according to claim 15, wherein the vents comprise one of slits, holes and combinations thereof.

17. A stretchable multi-layer wrap according to claims 3 and 4, wherein the wrap further comprises a label layer positioned between the first and fourth films, the label layer comprising indicia indicating one of use information for the multiplayer wrap, branding information for an item to be wrapped, location information for an item to be wrapped and combinations thereof.

18. The stretchable multi-layer wrap of claim 1 wherein the ribs are made of interwoven plastic material.

19. The stretchable multi-layer wrap of claim 1 wherein the ribs are rib tapes.

20. The stretchable multi-layer wrap according to claim 19, wherein the rib tapes comprise one of a low density polymer, a high density polymer and combinations thereof.

21. The stretchable multi-layer wrap according to claim 20 wherein the high density polymer is a high density polyethylene.

22. The stretchable multi-layer wrap according to claim 1 wherein the films are arranged so as to effect cling surface laminar engagement of the films.

23. The stretchable multi-layer wrap according to claim 1 wherein the metal coil is selected from a group of coils made from steel and aluminum.

24. A metal coil wrapped in a stretchable multi-layer wrap, said wrap comprising:

a first film having an inside cling surface;

a second film having an inside cling surface;

a plurality of ribs between the first film and the second film, the ribs including longitudinal ribs co-aligned with a longitudinal axis of the films and transverse ribs extending between and interconnecting the longitudinal ribs the wrap being stretchable sufficient to wrap the feedstock material;

the ribs having stretching properties that limit stretching of the wrap to enable unitisation of the feedstock material to reduce its susceptibility to environmental conditions; and the ribs being spaced apart to allow the inside cling surfaces of the first and second films to sufficiently engage to resist disengagement of the cling surfaces when the wrap is wrapped around the feedstock material.

25. A stretchable multi-layer wrap according to claim 24, wherein the first and second films are pre-stretched films and further stretching of the wrap is limited by the stretching properties of the ribs.

26. A stretchable multi-layer wrap according to claim 24, wherein the wrap further comprises:

a third film comprising a cling surface and the second film further comprises an outside cling surface, opposite the inside cling surface, the third film cling surface clingingly engaging the second film outside cling surface; and, a fourth film comprising a cling surface and the first film further comprises an outside cling surface, opposite the inside cling surface, the fourth film cling surface clingingly engaging the first film outside cling surface.

27. A stretchable multi-layer wrap according to claim 26, wherein the third film further comprises a rust inhibiting agent.

28. A stretchable multi-layer wrap according to claim 27, wherein the rust inhibiting agent is applied to a surface opposite the third film cling surface.

29. A stretchable multi-layer wrap according to claim 27, wherein the rust inhibiting agent is integrally formed with the third film.

30. A stretchable multi-layer wrap according to claim 29, wherein the rust inhibiting agent comprises a vapour corrosion inhibitor.

31. A stretchable multi-layer wrap according to claim 24, wherein the first and second films are similarly composed.

32. A stretchable multi-layer wrap according to claim 31, wherein the films comprise a low density polymer.

33. A stretchable multi-layer wrap according to claim 32, wherein the low density polymer comprises a low density polyethylene.

34. A stretchable multi-layer wrap according to claim 24, wherein each respective longitudinal rib comprises an interwoven plurality of rib tapes.

35. A stretchable multi-layer wrap according to claim 34, wherein each respective transverse rib comprises a rib tape.

36. A stretchable multi-layer wrap according to claim 35, wherein the rib tapes comprise one of a low density polymer, a high density polymer and combinations thereof.

37. A stretchable multi-layer wrap according to claim 36, wherein the high density polymer is a high density polyethylene.

38. A stretchable multi-layer wrap according to claims 24 and 25, wherein the wrap further comprises vents arranged on the wrap so as to permit venting of a wrapped item.

39. A stretchable multi-layer wrap according to claim 38, wherein the vents comprise one of slits, holes and combinations thereof.

40. A stretchable multi-layer wrap according to claims 26 and 28, wherein the wrap further comprises a label layer positioned between the first and fourth films, the label layer comprising indicia indicating one of use information for the multiplayer wrap, branding information for an item to be wrapped, location information for an item to be wrapped and combinations thereof.

41. The stretchable multi-layer wrap of claim 24 wherein the ribs are made of interwoven plastic material.

42. The stretchable multi-layer wrap of claim 24 wherein the ribs are rib tapes.

43. The stretchable multi-layer wrap according to claim 42, wherein the rib tapes comprise one of a low density polymer, a high density polymer and combinations thereof.

44. The stretchable multi-layer wrap according to claim 43 wherein the high density polymer is a high density polyethylene.

45. The stretchable multi-layer wrap according to claim 24 wherein the films are arranged so as to effect cling surface laminar engagement of the films.

46. A method of minimizing susceptibility of environmental conditions to metal coils, said method comprising:
wrapping the metal coil with a stretchable multi-layer wrap, said wrap having:
a first film having an inside cling surface;
a second film having an inside cling surface;
a plurality of ribs between the first film and the second film, the ribs including longitudinal ribs co-aligned with a longitudinal axis of the films and transverse ribs extending between and interconnecting the longitudinal ribs;
the wrap being stretchable sufficient to wrap the metal coil;
the ribs having stretching properties that limit stretching of the wrap to enable unitisation of the metal coil to reduce its susceptibility to environmental conditions; and
the ribs being spaced apart to allow the inside cling surfaces of the first and second films to sufficiently engage to resist disengagement of the cling surfaces when the wrap is wrapped around the metal coil.

47. The method of claim 46 wherein said stretchable multi-layer wrap is made by the method comprising:
passing the first cling film, the ribs and the second cling film through a roller that applies pressure therebetween sufficient to cause a clinging engagement of the films.

48. The method of claim 46, wherein the first and second films are pre-stretched films and further stretching of the wrap is limited by the stretching properties of the ribs.

49. The method of claim 46, wherein the wrap further comprises:
a third film comprising a cling surface and the second film further comprises an outside cling surface, opposite the inside cling surface, the third film cling surface clingingly engaging the second film outside cling surface; and,
a fourth film comprising a cling surface and the first film further comprises an outside cling surface, opposite the inside cling surface, the fourth film cling surface clingingly engaging the first film outside cling surface.

50. The method of claim 49, wherein the third film further comprises a rust inhibiting agent.

51. The method of claim 50, wherein the rust inhibiting agent is applied to a surface opposite the third film cling surface.

52. The method of claim 50, wherein the rust inhibiting agent is integrally formed with the third film.

53. The method of claim 51, wherein the rust inhibiting agent comprises a vapour corrosion inhibitor.

54. The method of claim 46, wherein the first and second films are similarly composed.

55. The method of claim 46, wherein the films comprise a low density polymer.

56. The method of claim 55, wherein the low density polymer comprises a low density polyethylene.

57. The method of claim 46, wherein each respective longitudinal rib comprises an interwoven plurality of rib tapes.

58. The method of claim 46, wherein each respective transverse rib comprises a rib tape.

59. The method of claim 57, wherein the rib tapes comprise one of a low density polymer, a high density polymer and combinations thereof.

60. The method of claim 59, wherein the high density polymer is a high density polyethylene.

61. The method of claim 46, wherein the wrap further comprises vents arranged on the wrap so as to permit venting of the metal coil.

62. The method of claim 61, wherein the vents comprise one of slits, holes and combinations thereof.

63. The method of claims 49 and 50, wherein the wrap further comprises a label layer positioned between the first and fourth films, the label layer comprising indicia indicating one of use information for the multiplayer wrap, branding information for an item to be wrapped, location information for an item to be wrapped and combinations thereof.

64. The method of claim 47 wherein the ribs are made of interwoven plastic material.

65. The method of claim 47 wherein the ribs are rib tapes.

66. The method of claim 65, wherein the rib tapes comprise one of a low density polymer, a high density polymer and combinations thereof.

67. The method of claim 66 wherein the high density polymer is a high density polyethylene.

68. The method of claim 47 wherein the films are arranged so as to effect cling surface laminar engagement of the films.

* * * * *